United States Patent [19]
Ball et al.

[11] Patent Number: 5,519,925
[45] Date of Patent: May 28, 1996

[54] DENIM FABRIC MADE FROM DENIM WASTE

[75] Inventors: Darlene L. Ball, Greensboro; Max H. Hance, Mooresville, both of N.C.

[73] Assignee: Burlington Industries, Inc., Greensboro, N.C.

[21] Appl. No.: 438,273

[22] Filed: May 10, 1995

Related U.S. Application Data

[60] Division of Ser. No. 308,807, Sep. 19, 1994, which is a continuation-in-part of Ser. No. 184,110, Jan. 21, 1994, Pat. No. 5,369,861.

[51] Int. Cl.⁶ .................. D06M 23/00; D06M 101/06
[52] U.S. Cl. .................. 28/299; 28/100; 66/202; 57/400
[58] Field of Search .................. 19/98; 28/100, 28/299; 57/400

[56] References Cited

U.S. PATENT DOCUMENTS

| 5,331,801 | 7/1994 | Heifetz | 19/98 X |
| 5,369,861 | 12/1994 | Ball et al. | 78/299 |

Primary Examiner—John J. Calvert
Attorney, Agent, or Firm—Nixon & Vanderhye

[57] ABSTRACT

Denim fabric suitable for use as apparel is made from about 40–100% fibers produced from denim waste (pre-consumer and/or post-consumer). The denim waste is collected, starch and size are optionally removed, and it is subjected to garnetting to produce denim fibers, the vast majority of fiber lengths greater than about 0.4 inches, and an average length greater than 0.5 inches. The denim fibers are then opened, and subjected to low-tension carding, as by using a Rieter C-4 type card with conveyor belt. The carded denim fibers are spun into filling yarn having a yarn count between about 4.0/1 to 16.0/1, and/or a warp or knitting yarn having a yarn count between about 4.0/1 to 16.0/1. The warp or knitting yarn may be plied with like reclaimed warp yarn, or with virgin fiber warp yarn. There may also be the steps of adding lubricant to the fibers, sorting the denim waste by color and separately processing different colors of denim waste, making the denim fabric into apparel, dyeing the yarn or fabric to provide a substantially uniform color or fabric, and/or cleaning the fibers between the opening and carding steps. The denim fabric produced has strength and related properties sufficient for consumer use.

15 Claims, 2 Drawing Sheets

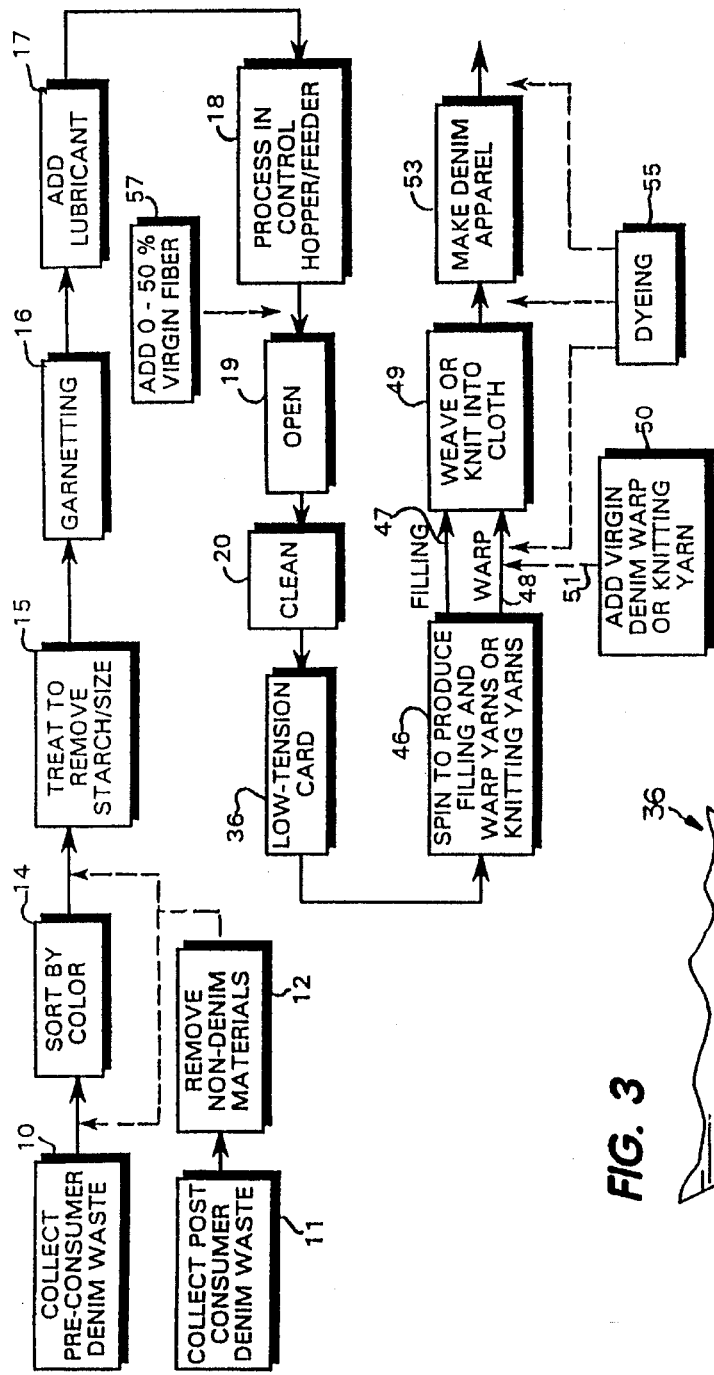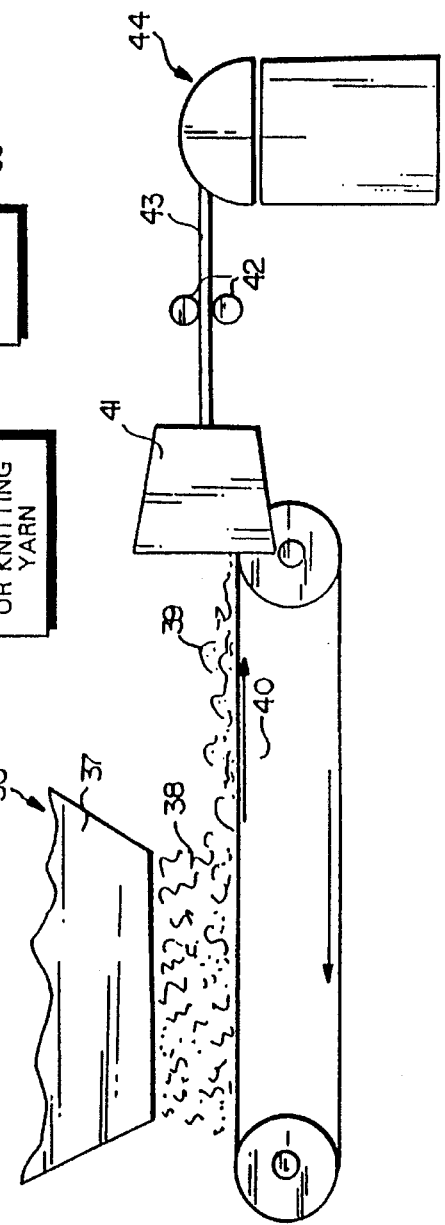

DENIM FABRIC MADE FROM DENIM WASTE

CROSS-REFERENCE TO RELATED APPLICATION

This application is a divisional of U.S. application Ser. No. 08/308,807 filed Sep. 19, 1994, which in turn is a continuation-in-part of U.S. application Ser. No. 08/184,110 filed Jan. 21, 1994, now U.S. Pat. No. 5,369,861.

BACKGROUND AND SUMMARY OF THE INVENTION

In an era of scarce resources and increasing population, it is desirable to reclaim and reuse as many resources as possible. In the textile industry, for many years wool clothing and other types of woolen products have been torn apart using a process known as garnetting and the fibers reused in clothing and wool rugs. Garnetting is a process by which material such as threads, rags, woven cloth scraps, and the like are broken up and returned to a substantial fluffy, fibrous condition simulating the original condition of the fiber. This is done by first chopping the material to small pieces (e.g. two to six inches) and then running the pieces through a series of high speed cylinders which can be covered with wire (e.g. saw wire), steel spikes, or the like. The treatment breaks up the material into individual fibers typically having a length of one and one-eighth inches or less.

Despite the known desirability of reusing resources, and the known recycling of woolen products for many years, attempts to reclaim and reuse cotton fibers from old garments, scraps and rags have encountered large obstacles which have always prevented the development of a practical, commercial approach. Garnetting or separation of the cotton fiber from the original materials must be severe enough to cause fiber separation, but in so processing the materials, the fibers produced were damaged and broken. The result was very short fibers, typically of one-half inch or less, which are too short to make into yarn and fabric using commercial processes. Therefore the recycling or reclamation of cotton fibers has typically been restricted to the production of low end textile products, such as mops or non-woven materials.

According to the present invention, a method and fabric are provided whereby denim cotton fibers can effectively be reclaimed. The fabric produced according to the invention has properties comparable to that of denim fabric made from virgin yarn, and is suitable for essentially all apparel applications that virgin denim yarn may be used for. While the invention is also useful in association with post-consumer denim waste material, it is particularly useful to employ pre-consumer denim waste such as cutting table scraps of denim cotton fabrics, actual cotton thread, denim yarn waste, and denim fabric scraps left over from the cutting out of patterns for garments. This has an enormous potential for resource recovery due to the large volume of denim garments that are produced yearly, from indigo dyed denim and sulfur black dyed denim and other colors using millions of pounds of cotton each year. For example, the consumption of cotton for denim fabric in the United States during 1992 was over 800 million pounds. Cloth scraps make up approximately 10% of this amount, depending upon patterns cut, meaning that there is presently annual waste to landfills or incinerators for denim scraps alone of close to 80 million pounds per year since the markets for the low end textile products using cotton fibers typically do not employ denim, or if they do only a small fraction of the denim waste that exists is employed.

According to the invention, denim yarns and denim fabrics can be produced containing from about 40% to 100% (preferably about 60–100%) of reclaimed cotton from pre-consumer denim waste and/or post-consumer denim waste. According to the present invention it has been found that if the appropriate treatment steps are practiced and if the garnetted scrap material is carded in a low tension manner, it is possible to spin yarn from the reclaimed denim waste fibers, and produce yarns for weaving or knitting, e.g. filling yarn having a yarn count of about 4.0/1 to 12.0/1, and warp yarn (for plying with itself or with virgin yarn) having a yarn count of about 9.0/1 to 16.0/1.

According to one aspect of the present invention a method of making denim fabric is provided comprising the steps of substantially sequentially: (a) Collecting denim waste. (b) Garnetting the denim waste to produce denim fibers with the vast majority having fiber lengths greater than about 0.4 inches (and the average fiber length greater than about 0.5 inches). (c) Opening the denim fibers. (d) Low-tension carding the opened denim fibers. (e) Spinning the carded denim fibers into yarn. And, (f) weaving or knitting the yarn into fabric having at least about 40% of the total fiber content of the fabric from the denim waste collected in step (a).

There may also be the further steps of adding lubricant to the fibers after step (b), for example, between steps (b) and (c); removing size and starch from the denim waste prior to step (b); sorting the denim waste by color between steps (a) and (b) and separately processing different colors of denim waste, making the denim fabric into denim apparel; and after either step (e) or step (f) dyeing the yarn or fabric to produce a substantially uniform color of fabric. There may also be the further step, between the opening and carding steps, of cleaning the fibers, as with an ERM feeder. There also may be the further step of adding some virgin denim fiber, up to about 50% (preferably up to about 40%) of the total fiber content, to the denim fibers from step (b) prior to step (d).

Where step (f) is weaving, step (e) is practiced to produce filling yarns; step (e) is also typically practiced to produce yarn and step (f) is practiced using both filling and warp or knitting yarn from step (e). There is also the option of a further step of plying the warp yarns from step (e) together before practicing step (f), or plying warp yarns from step (e) together with virgin denim yarn before practicing step (f).

The size removal step—if utilized—is typically practiced by treating the denim material with amylase enzyme. Step (a) may be practiced by collecting pre-consumer denim waste only, or by collecting post-consumer denim waste, or both pre-consumer and post-consumer denim waste. For the post consumer denim waste there is preferably the further step of removing non-denim materials (for example, zippers, buttons, rivets, leather patches and the like) from the waste prior to other processing. Also steps (e) and (f) may be practiced to produce denim fabric having approximately 100% of the fiber content thereof from the fiber collected in step (a), and step (e) may be practiced using a Rieter C-4 type card (or a Rieter C-5 or C-10) with a conveyor belt.

According to another aspect of the present invention a woven denim fabric having warp and filling yarns is provided by practicing the steps of the method set forth above. Step (f) may also be practiced to make the warp yarn, where the filling yarn of the fabric has a yarn count of about 4.0/1 to 12.0/1, and the warp yarn is warp yarn from step (f) having a yarn count of about 4.0/1 to 16.0/1 and could be plied with other warp yarn from step (f), or with virgin denim yarn.

One aspect of the present invention is a knitted fabric made from yarns produced in step (f).

According to another aspect of the present invention a woven denim fabric is provided having filling and warp yarns. The fabric has substantially 100% of the filling yarn made from pre-consumer, post-consumer, or both preconsumer and post-consumer denim waste, and has at least about 40% of the total of filling and warp yarns made from pre-consumer, post-consumer, or both pre-consumer and post-consumer denim waste. The fabric may have about 100% of the total of filling and warp yarns made from pre-consumer, post-consumer, or both pre-consumer and post-consumer denim waste.

The invention also contemplates a knit fabric from denim waste made by practicing the steps of substantially sequentially: (a) collecting denim waste; (b) garnetting the denim waste to produce denim fibers having the vast majority of the fiber lengths greater than about 0.4 inches; (c) opening the denim fibers; (d) low-tension carding the opened denim fibers; (e) spinning the carded denim fibers into yarn; and (f) knitting the yarn into fabric having at least about 40% of the total fiber content of the fabric from the denim waste collected in step (a).

It is the primary object of the present invention to make apparel-quality denim fabric (and apparel therefrom) from denim waste. This and other objects of the invention will become clear from an inspection of the detailed description of the invention and from the appended claims.

BRIEF DESCRIPTION OF THE DRAWINGS

FIG. 1 is a schematic box diagram schematically illustrating exemplary method steps in the practice Of the method according to the present invention;

FIG. 3 is a schematic view illustrating the operation of a low-tension card machine in the practice of the method of the present invention.

DETAILED DESCRIPTION OF THE DRAWINGS

Figure 2:
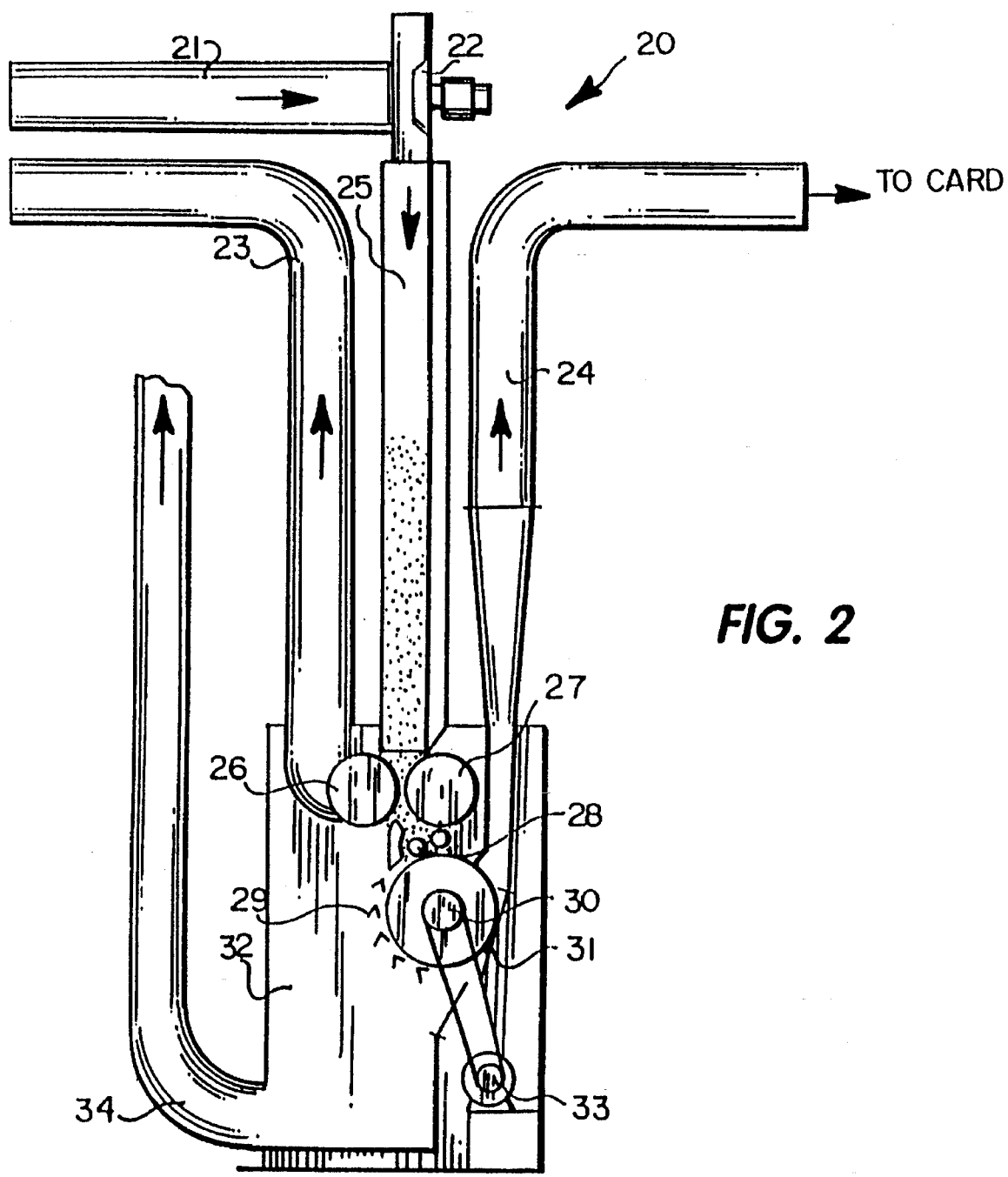
FIG. 2 is a side schematic view illustrating an exemplary cleaner used in practicing the "clean" step of FIG. 1.

FIG. 1 schematically illustrates an exemplary method of producing denim cloth, apparel, or knitted garments from denim waste. The first step in the process is the collection of pre-consumer denim waste as indicated by box 10 in FIG. 1. The term "pre-consumer denim waste" means cutting table scraps of denim cotton fabrics, natural cotton thread, denim yarn waste, and denim fabric scraps left over from the cutting out of patterns for garments. While the collection and use of only pre-consumer denim waste (as indicated by box 10) is the simplest manner of practicing the present invention, optionally according to the present invention, post-consumer denim waste may also be collected for utilization, as indicated by box 11 in FIG. 1, along with, or instead of, the pre-consumer denim waste collected as indicated at box 10. If post-consumer denim waste, such as from old clothes repositories, rag companies, or the like, is collected as indicated by box 11, it is desired to remove all the non-denim materials therefrom as indicated by box 12. Particularly zippers, buttons, rivets, leather patches, synthetic fiber/nonwovens, or other foreign materials should be removed before the denim waste could be utilized, and such removal may have to be accomplished by hand to ensure a raw material of sufficient integrity.

After collection of the denim waste as indicated by box 10 (and/or boxes 11, 12) preferably the denim waste may be sorted by color, either automatically using an optical sorter, or by hand. The two most common colors are indigo dyed (blue) and sulfur dyed black denim, although white, natural, red, green and other colors are of course known. After separation by color in box 14, the different color streams are preferably processed separately, and the rest of the schematic of FIG. 1 illustrates the processing for one of the color sorted streams (e.g. an indigo dyed (blue) stream).

An optional first step after color sorting is a treatment to remove starch and size, as indicated by box 15 in FIG. 1. Preferably this is accomplished utilizing amylase enzyme which converts starch on the yarn or fabric to sugar, which is water soluble and can be washed out of the fabric or the yarn. Such a treatment is typically about 15 minutes long, and may be effectively practiced by adding 1–2% on weight of scraps of RAPIDASE-XL, a trademark for amylase enzyme manufactured by International Bio Synthetics, at 140° F. This 15 minute enzyme treatment at 140° F. is followed by a rinse bath for five minutes at 140° F. which extracts the sugar, and then by tumble drying. The equipment utilized to practice this treatment is typically commercial type washing and drying machines. A batch process is presently the most desirable since it utilizes conventional machines, but a continuous process can also be designed. Alternatively, the optional treatment of box 15 could be practiced by acid hydrolysis.

After box 15—if utilized—the denim waste is subjected to garnetting as indicated by box 16. As described above, garnetting is a process by which materials such as threads, rags, woven cloth scraps, and the like are broken up and returned to a fluffy, fibrous condition, simulating the original condition of the cotton fiber. This is preferably accomplished by first chopping the denim waste into smaller pieces (e.g. 2–6 inch maximum dimension), and then running it through a series of high speed cylinders. The cylinders are typically covered by wire (e.g. saw wire), steel spikes, or the like. Garnetting breaks down the denim waste into individual cotton fibers. While any fiber length greater than about 0.4 inches is useful, garnetting rarely produces fibers having a length of greater than one and one-eighth inches. Lengths of about 0.4–0.8 inches are typical, with a length of about 0.6 inches (i.e. over 0.5 inches) being about average, and the vast majority (e.g. more than 90%) over 0.4 inches in length.

After garnetting, lubricant may optionally be added as indicated by box 17. The lubricant is added to reduce friction among fibers when processing, particularly in subsequent carding and spinning processes. Typical lubricants are high density emulsified polyethylene (e.g. Moropol HD-25 available from Moretex Chemical Company), fatty amide (e.g. SEDGESOFT STT-2 available from Sedgefield Chemical Company), and sulfated quaternary amine (e.g. SEDGE-SOFT LVC-2 available from Sedgefield Chemical Company).

If lubricant is utilized, after lubricant is added, the denim waste is processed—as indicated by box 18—through a fiber control hopper/feeder of conventional design to an opener, as indicated by box 19. A typical opener that is suitable is a Rieter fine opener (Model ERMB-55 for example). Typically after opening at box 19 the material is cleaned as indicated generally by box 20 in FIG. 1, and by the apparatus 20 of FIG. 2.

As illustrated schematically in FIG. 2, the ERM-cleaner 20 includes a material supply 21 extending from the opening stage 19, terminating in a feed head with fan 22 at the top of a laminar chute 25 filled with the material. Exhaust air piping 23 is also provided, as well as a conduit 24 for delivery of the cleaned material to the carding step (36 in FIG. 1).

The cleaner 20 further comprises a plain drum 26, dust cage 27, and feed rollers 28. Below the feed rollers 28 is a knife grid 29 and an opening and cleaning beater 30, a suction duct 31 pulling the cleaned fiber into the delivery conduit 24. A motor 33 drives the opening and cleaning beater 30. Surrounding the knife grid 29 is the waste chamber 32, which can be connected to an automatic waste removal system, which would include the waste removal pipe 34.

After the conventional cleaning stage 20, the fibers are typically transmitted to the low tension card stage 36 illustrated by a box diagram in FIG. 1 and schematically in FIG. 3. It is necessary to handle the fibers so that there is minimum tension or strain on the web 38 being discharged from the head 37 of the card 36. This is accomplished by simply depositing the web 38 in basically loose form 39 on a conveyor belt 40 which conveys the material 39 slowly to the trumpet 41. Downstream of the trumpet 41 are rollers 42 which convey the sliver rope 43 that is formed after passage of the material 39 through the trumpet 41 to a take-up device (coiler) 44 for the sliver rope 43. The card 36 illustrated schematically in FIG. 3 is preferably a Rieter C-4 type Card (e.g. C4-A), which is commercially available from Rieter Machine Works Ltd. of Switzerland. Other suitable cards are the Rieter C-5 and C-10 cards.

From the coiler 44, the sliver rope 43 is typically ultimately (typically at a different machine location) passed to a spinning stage illustrated schematically at 46 in FIG. 1. For example the spinning stage 46 may utilize a Rieter open-end conventional spinning frame. Different spinning machines, illustrated schematically by box 46, may be utilized to produce both filling and warp yarn. The open end yarn produced by the spinning stage 46 may produce filling yarn—indicated schematically at 47 in FIG. 1—into counts of about 4.0/1 to 16.0/1 (e.g. 4/1 to 12/1, with about 5.25/1 being typical), while warp or knitting yarn—illustrated schematically at 48 in FIG. 1—can be made having counts of about 4.0/1 to 16.0/1 (e.g. 9.0/1 to 16.0/1). Preferably the warp yarn 48, before being woven into cloth in a loom, as indicated schematically at 49 in FIG. 1, is plied (using conventional plying techniques) either with other warp yarns 48, or with virgin denim warp yarn 51 from source 50. Singles yarn may also be used.

The cloth produced by the weaving stage (loom) 49 has at least about 40% of the total fiber content thereof from the denim waste collected in stages 10 and/or 11, and may contain up to about 100% fiber from stages 10/11. Woven cloth made from reclaimed denim filling and warp yarns has been produced and tested, with the results indicating that the fabric has the strength and other characteristics sufficient for the resultant fabric to be used in the manufacture of apparel. As indicated by box 53 in FIG. 1, the woven cloth produced by loom 49 may be made into denim apparel, the cloth produced by loom 49 being suitable for virtually any application which currently uses denim fabric.

As earlier indicated, instead of weaving the yarn into fabric, the yarn from 46 may be knit into a denim fabric, such as generally taught in U.S. Pat. No. 4,613,336 (the disclosure of which is hereby incorporated by reference herein).

Under some circumstances it may be desirable to dye the yarn, cloth, or garments produced so that they have a substantially uniform color. This is indicated schematically at 55 in FIG. 1, the options of dyeing the filling and/or warp (or knitting) yarns 47, 48, the cloth produced by loom 49, or the garments produced from stage 53, all being possible.

Instead of, or in addition to, supplying as part of the warp or knitting yarn virgin denim yarn from source 50, from about 0–60% (preferably 0–40%) of the fiber led to the opener 19 (i.e. before carding at 36) may be virgin yarn—e.g. from source 57 seen in FIG. 1—so that the spun yarn produced at 46 itself has between about 0–60% virgin fiber. In this case it is from less desirable to totally unnecessary to ply the yarn produced at 46 with virgin denim yarn from 50.

It will thus be seen that according to the present invention a woven or knit denim fabric may be produced, a woven fabric having filling and/or warp yarns, with substantially 100% of the filling yarn made from pre-consumer, post-consumer, or both, denim waste, and having at least about 40% (preferably at least about 60%) of the total filling and warp yarns made from pre-consumer, post-consumer, or both, denim waste, and advantageous methods of producing such fabric, and garments therefrom, are provided, and a knit fabric produced with up to 100% reclaimed fiber in counts of about 4/1–16/1. While the invention has been herein shown and described in what is presently conceived to be the most practical and preferred embodiment thereof, it will be apparent to those of ordinary skill in the art that many modifications may be made thereof within the scope of the invention, which scope is to be accorded the broadest interpretation of the appended claims so as to encompass all equivalent products and methods.

What is claimed is:

1. A woven denim fabric having warp and filling yarns and made by practicing the steps of substantially sequentially: (a) collecting denim waste; (b) garnetting the denim waste to produce denim fibers having the vast majority of the fiber lengths greater than about 0.4 inches; (c) opening the denim fibers; (d) carding the opened denim fibers; (e) spinning the carded denim fibers into filling yarn; and (f) weaving the filling yarn into fabric having at least 40% of the total fiber content of the fabric from the denim waste collected in step (a); so that the woven denim fabric has denim waste fibers forming at least 40% of the total fiber content thereof, and the vast majority of the denim waste fibers have a fiber length greater than about 0.4 inches.

2. A denim fabric as recited in claim 1 wherein the filling yarn has a count of about 4.0/1 to 16.0/1; and wherein step (f) is practiced to provide fabric with at least about 60% of the total fiber content of the fabric from the denim waste collected in step (a).

3. A denim fabric as recited in claim 1 wherein step (e) is also practiced to make warp yarn; and wherein the filling yarn of the fabric has a yarn count of about 4.0/1 to 16.0/1, and the warp yarn is warp yarn from step (e) having a yarn count of about 4.0/1 to 16.0/1 and plied with itself or virgin denim yarn, and wherein the denim fabric has denim waste fibers with an average fiber length of greater than 0.5 inches.

4. A fabric as recited in claim 1 wherein step (b) is practiced so as to produce denim fibers with an average length of about 0.6 inches, so that the denim fabric has denim waste fibers with an average length of about 0.6 inches.

5. A fabric as recited in claim 1 having approximately 100% of the fiber content thereof from the fiber collected in step (a).

6. A fabric as recited in claim 1 wherein step (a) is practiced by collecting post consumer denim waste.

7. A fabric as recited in claim 1 comprising the further step, before step (b), of removing starch and size from the denim waste.

8. A knit fabric made from denim waste and made by practicing the steps of substantially sequentially: (a) collecting denim waste; (b) garnetting the denim waste to produce denim fibers having the vast majority of the fiber lengths greater than about 0.4 inches; (c) opening the denim fibers; (d) low-tension carding the opened denim fibers; (e) spinning the carded denim fibers into yarn; and (f) knitting the yarn into fabric having at least 40% of the total fiber content of the fabric from the denim waste collected in step (a).

9. A fabric as recited in recited in claim 8 wherein step (f) is practiced to knit fabric having at least 60% of the total fiber content thereof from the denim waste collected in step (a).

10. A fabric as recited in claim 9 wherein step (e) is practiced to produce knitting yarn having a yarn count between about 4.0/1 to 16.0/1.

11. A fabric as recited in claim 8 wherein step (e) is practiced to produce knitting yarn having a yarn count between about 4.0/1 to 16.0/1.

12. A fabric as recited in claim 8 having approximately 100% of the fiber content thereof from the fiber collected in step (a).

13. A fabric as recited in claim 8 wherein step (b) is practiced so as to produce denim fibers with an average length of about 0.6 inches, so that the denim fabric has denim waste fibers with an average length of about 0.6 inches.

14. A fabric as recited in claim 8 wherein step (a) is practiced by collecting post consumer denim waste.

15. A fabric as recited in claim 8 comprising the further step, before step (b), of removing starch and size from the denim waste.

* * * * *